UNITED STATES PATENT OFFICE.

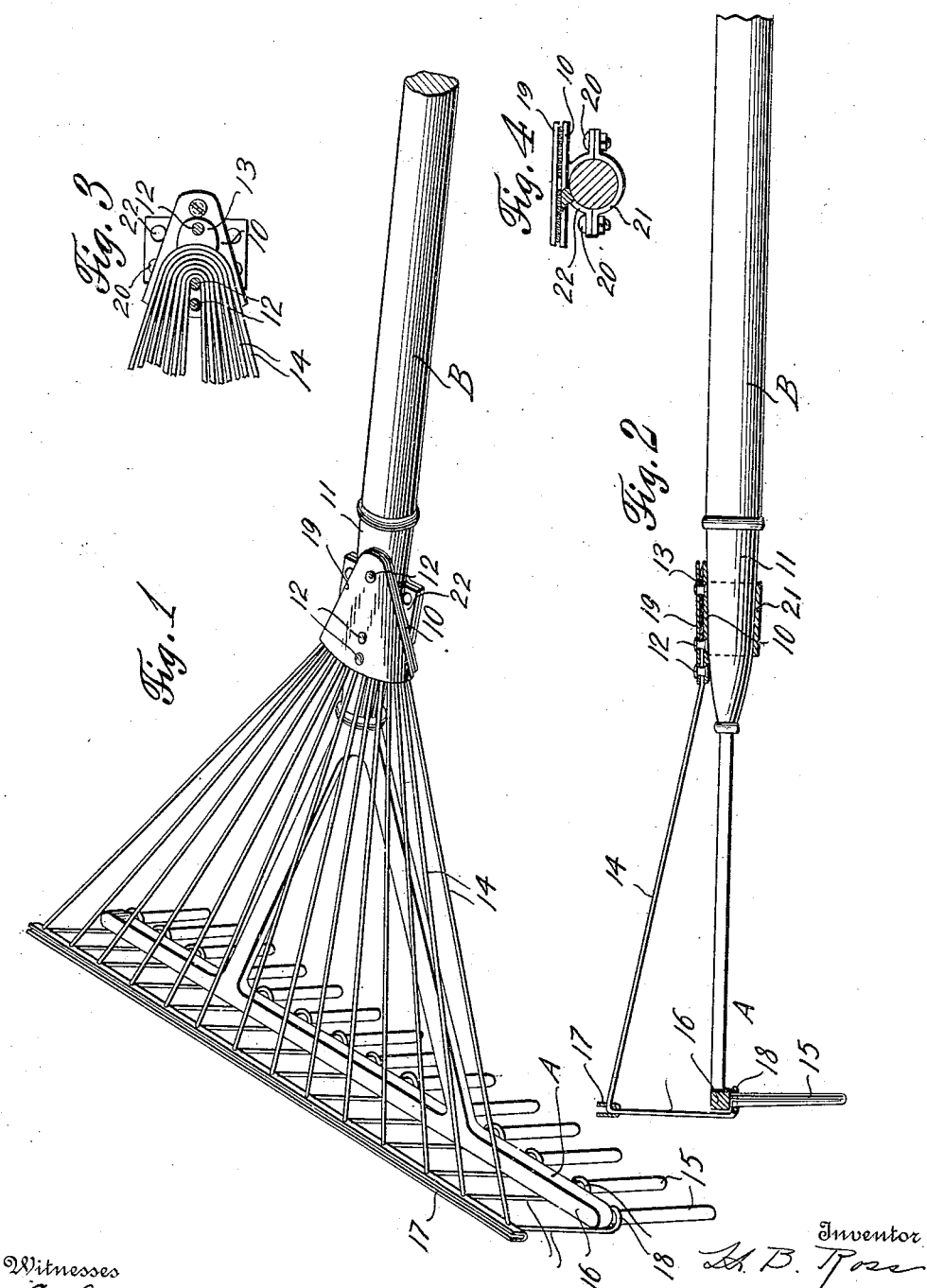

HAROLD B. ROSS, OF ETIWANDA, CALIFORNIA.

RAKE-TOOTH CLEANER.

979,340.    Specification of Letters Patent.    Patented Dec. 20, 1910.

Application filed March 15, 1910. Serial No. 549,543.

*To all whom it may concern:*

Be it known that I, HAROLD B. ROSS, a citizen of the United States, residing at Etiwanda, in the county of San Bernardino and State of California, have invented certain new and useful Improvements in Rake-Tooth Cleaners, of which the following is a specification.

This invention relates to garden rakes and is designed particularly to provide an attachment for the same whereby the teeth thereof may be readily cleaned.

This invention also contemplates the construction of the attachment in such a manner that the same will in no way interfere with the operation of the rake when the former is carried thereby.

With the above and other objects in view, this invention consists of the construction, combination and arrangement of parts all as hereinafter more fully described, claimed and illustrated in the accompanying drawings, wherein:

Figure 1 is a perspective view of a rake, said rake being supplied with an attachment constructed in accordance with the present invention; Fig. 2 is a longitudinal section of a rake supplied with the present invention; Fig. 3 is a top plan view of the clamping means with the upper plate thereof removed; Fig. 4 is a transverse section taken through the attaching plates.

Reference being had to the drawings, A indicates the handle of a rake having secured thereto the rake portion B through the medium of a ferrule 11.

The attachment forming the subject-matter of the present invention comprises an attaching plate 10 of any shape or formation preferably, however, substantially triangular, adapted to conform to a certain extent with the ferrule 11 through the instrumentality of which the handle A of the rake is secured to the rake portion B. A plurality of rivets 12 are centrally disposed on the exterior of the plate 10 and supply a means of securing the clamping plate 19 to the attaching plate, and further of retaining the spring supporting fingers of the attachment in position.

The rivet located adjacent to the handle A has secured thereto adjacent the base thereof the cap 13 which combines with the rivets 12 to further retain the spring members in position.

A plurality of fingers 14 are carried by the attaching plate, each of said fingers coöperating with one of the teeth 15 of the rake, and converging from above the back bar 16 of said teeth to the attaching plate 10 where they are bent and said bent portions interposed between the cap 13 and the adjacent rivet 12. A single piece of wire forms two fingers, said wire being bent through the retaining plate and thence to the corresponding tooth upon the opposite side of the rake. The free terminals of the fingers are secured to a U-shaped bar 17, said U-shaped bar being provided with coinciding openings in one arm thereof and in the base portion through which pass the fingers 14, said fingers after passing therethrough being approximately vertical.

The lower terminals of the fingers are bent to engage and conform with the contour of each individual tooth of the rake, and consequently upon the reciprocation of the bent portions 18 any grass or vegetable matter accumulated on the teeth will be removed therefrom.

In order to provide a means whereby the bar 17, which is parallel to the back bar 16 of the rake, may be supported therefrom the fingers are bent upwardly immediately after leaving the space between the clamping plate 19 and the attaching plate 10. As the fingers are formed of spring material, the same will elevate the bar 17 from the back bar 16 and the bent portions 18 to a position on the teeth adjacent the back bar until some outside force is applied thereto.

In order to supply a means whereby the present invention may be detachably secured to a rake of any nature and construction, a semi-circular attaching member 22 is formed on the base plate 10 and is pierced by a plurality of openings 20. A clamping plate 21 coöperates with said member and removably secures the device to the ferrule 11 of the rake.

Having thus fully described my invention, what is claimed as new is:

1. An attachment of the class described comprising an attaching plate, centrally disposed rivets secured to said attaching plate, a cap carried by the rearmost rivet, a plurality of fingers engaged between one of said rivets and the cap, a clamping plate secured on said rivets, a bar spacing the forward terminals of the fingers, said fingers passing through said bar, the free terminals thereof being retained vertically thereby, said forward terminals adapted to conform with the formation of the teeth of the rake.

2. An attachment of the class described, comprising an attaching plate, centrally disposed rivets secured to said attaching plate, a cap carried by the rearmost rivet, a plurality of fingers engaged between one of said rivets and the cap, a clamping plate secured on said rivets, a U-shaped bar spacing the forward terminals of the fingers, said fingers passing through one arm and the base of said bar, the free terminals thereof being retained vertically thereby, said forward terminals adapted to conform with the formation of the teeth of the rake and be retained against the back bar of the rake by the resiliency of the fingers aforesaid.

3. In an attachment of the class described, the combination with a base clamping plate of a semi-circular attaching member formed on said base plate, a clamping plate adapted to engage said rake and coöperate with said base plate, and simultaneously operating means whereby the teeth of the rake may be cleaned, said means being secured between the plates.

In testimony whereof I affix my signature in presence of two witnesses.

HAROLD B. ROSS.

Witnesses:
WM. BRICKLEY,
CHAS. DONNELLY.